United States Patent [19]

Shirasawa

[11] Patent Number: 4,470,664
[45] Date of Patent: Sep. 11, 1984

[54] REFLECTOR DEVICE FOR USE WITH OPTICAL DISTANCE MEASURING APPARATUS

[75] Inventor: Akishige Shirasawa, Tokyo, Japan

[73] Assignee: Tokyo Kogaku Kikai Kabushiki Kaisha, Tokyo, Japan

[21] Appl. No.: 412,163

[22] Filed: Aug. 27, 1982

[30] Foreign Application Priority Data

Aug. 31, 1981 [JP] Japan .................. 56-129223[U]

[51] Int. Cl.³ .................. G01C 3/08; G02B 5/122; G02B 17/4
[52] U.S. Cl. .................. 350/102; 33/279; 33/293; 248/473; 248/477; 350/287; 356/4; 356/5; 356/152
[58] Field of Search .......... 350/97, 100, 102, 287; 356/4, 5, 152; 248/473, 474, 477, 478, 480; 33/277–280, 293

[56] References Cited

U.S. PATENT DOCUMENTS 4,311,382  1/1983  Buckley et al. .................. 350/102
4,343,550  8/1982  Buckley et al. .................. 356/5

FOREIGN PATENT DOCUMENTS 475891  3/1972  Japan .

Primary Examiner—John K. Corbin
Assistant Examiner—William Propp
Attorney, Agent, or Firm—Brumbaugh, Graves, Donohue & Raymond

[57] ABSTRACT

A reflector device for use with an optical distance measuring apparatus which includes a frame carrying a reflecting element such as a corner cube type prism and a holder for mounting the frame. The frame has a reference surface and the holder has two or more reference surfaces which are adapted to be alternately engaged with the reference surface on the frame so that the offset value of the prism can be changed.

8 Claims, 9 Drawing Figures

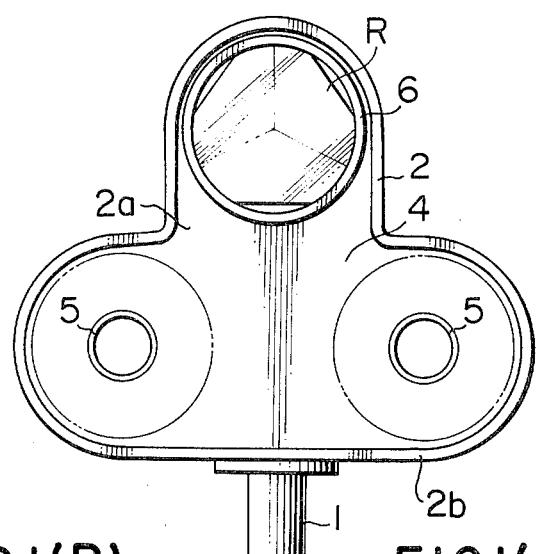
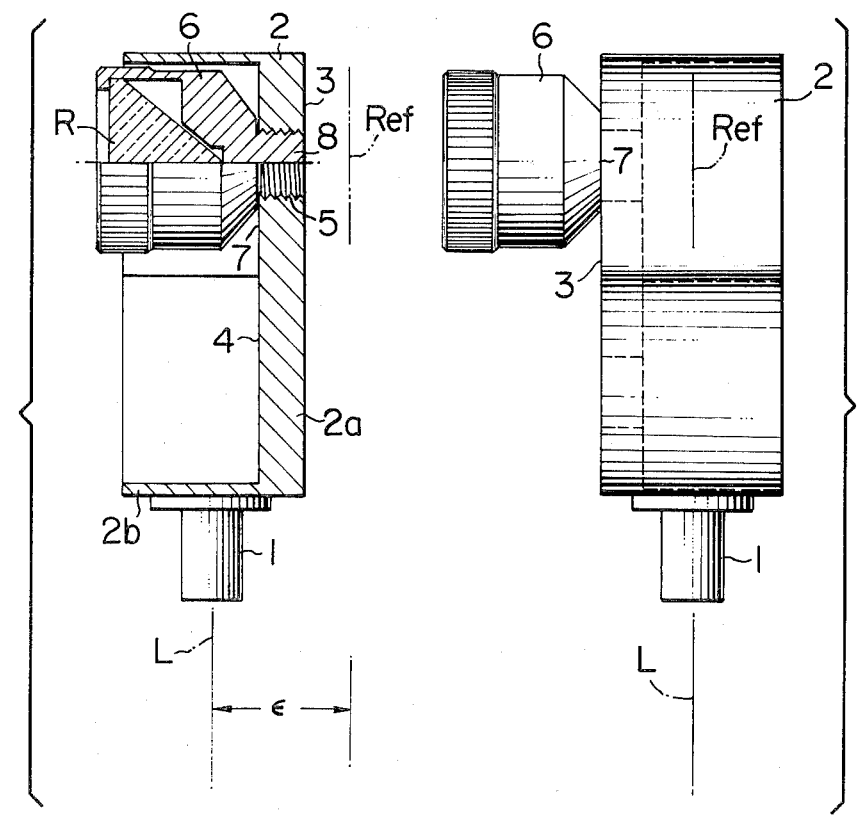
FIG. I(A)
FIG.I(B)  FIG.I(C)

REFLECTOR DEVICE FOR USE WITH OPTICAL DISTANCE MEASURING APPARATUS

BACKGROUND OF THE INVENTION

This invention relates to a reflecting mirror device for use in an optical distance measuring apparatus.

In the field of surveying, an optical distance measuring apparatus has been used for precisely measuring distances by utilizing the phase difference of projected and incident beams of light. Such optical distance measuring apparatus have also been combined in a so-called "total station" with a conventional theodolite or photoelectric rotary encoder to thereby carry out not only the distance measurement but also angular measurements. To measure a distance with the optical distance measuring apparatus or the total station, it is necessary to place a reflecting mirror device at a point to be measured so as to reflect the beam of light emitted from the apparatus back to the apparatus. A corner cube type prism has generally been used as the means for reflecting the beam of incoming light along the same line but in the opposite direction. As well known in the art, a corner cube type prism includes a planar incident and emitting surface and three reflecting surfaces which are perpendicular to each other and inclined with respect to the incident and emitting surface. Supposing that the incident and emitting surface and the reflecting surfaces are replaced by a single planar reflecting surface, such imaginary reflecting surface would be at a distance $nl$ from the position of the incident and emitting surface assuming that $l$ is a distance between the incident and emitting surface and the point of intersection between the reflecting surfaces, and $n$ the refractive index of the prism. It would be apparent for obtaining high measuring accuracy that the imaginary reflecting surface must coincide with a vertical line passing through the point to be measured.

Conventional reflecting mirror devices can be broadly classified into two types, the first being a so-called "zero prism constant" type, in which the imaginary reflecting surface is located vertically above the point to be measured when the mirror device is positioned at a predetermined location with respect to the point to be measured by aligning the weight at the tip of a pendulum on the reflecting mirror device, or viewing the point to be measured by a centering telescope. The second type is that in which the imaginary reflecting surface is offset by a distance from the vertical line passing through the point to be measured when the mirror device is approximately positioned with respect to the point to be measured. The offset distance is referred as the prism constant or "offset value" and the value is 30 mm, for example, it is called "offset value 30". The optical distance measuring apparatus using the reflecting mirror device having such prism constant includes an offset mechanism which corrects the measured value of the distance taking into account the prism constant and then displays the corrected value as the result of measurement. For this purpose, the offset mechanism is set in advance in accordance with a specific value of the prism constant.

Practically, however, reflecting mirror devices adapted to be associated with specific ones of the optical distance measuring apparatus may have different prism constants, so that if it is desired to use an optical distance measuring apparatus with a reflecting mirror device having a prism constant which is different from that with which the particular distance measuring apparatus, the offset value corresponding to the prism constant must be changed by readjusting the offset mechanism. Since the offset mechanism is generally incorporated inside the apparatus, readjustment of the offset value can not be made unless the apparatus is disassembled. In order that the reflecting mirror device be compatible to several apparatus, the offset value of the offset mechanism of the apparatus must be changed for each reflecting mirror device.

It is therefore an object of the present invention to eliminate these problems in the prior art devices. Another object of the present invention is to provide a reflecting mirror device whose prism constant can be changed by adjusting the mounting of a prism reflection member assembly in the mirror device.

The reflector device in accordance with the present invention includes optical reflection means for reflecting a beam of light from an optical distance measuring apparatus, frame means for mounting said optical reflection means, said frame means having at least one first reference abutment portion, holder means for holding said frame means, said holder means having at least two second reference abutment portions, whereby the reflector device has a first prism constant when the first reference abutment portion comes into contact with one of the second reference abutment portions of the holder means and a second prism constant which is different from the first prism constant when the first reference abutment portion comes into contact with the other of said second abutment portions of the holder means.

The above and other objects and features of the present invention will become apparent from the following descriptions of preferred embodiments taking reference to the accompanying drawings, in which;

FIG. 1(A) is a front view of a reflecting device in accordance with one embodiment of the present invention;

FIG. 1(B) is a sectional view of the device shown in FIG. 1(A);

FIG. 1(C) is a side elevational view of the device shown in FIG. 1(A);

Figure 2A:
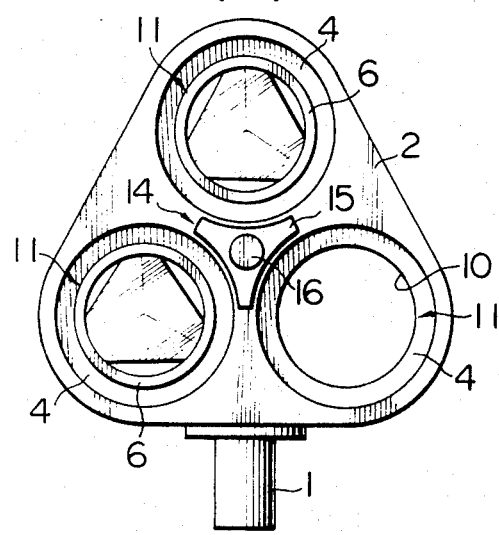
FIG. 2(A) is a front view of a reflecting device in accordance with another embodiment of the present invention.
Figure 2B:
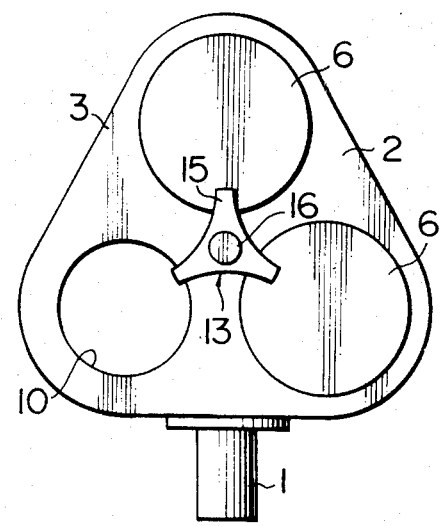
FIG. 2(B) is a rear view of the holder in the device shown in FIG. 2(A)
Figure 2C:
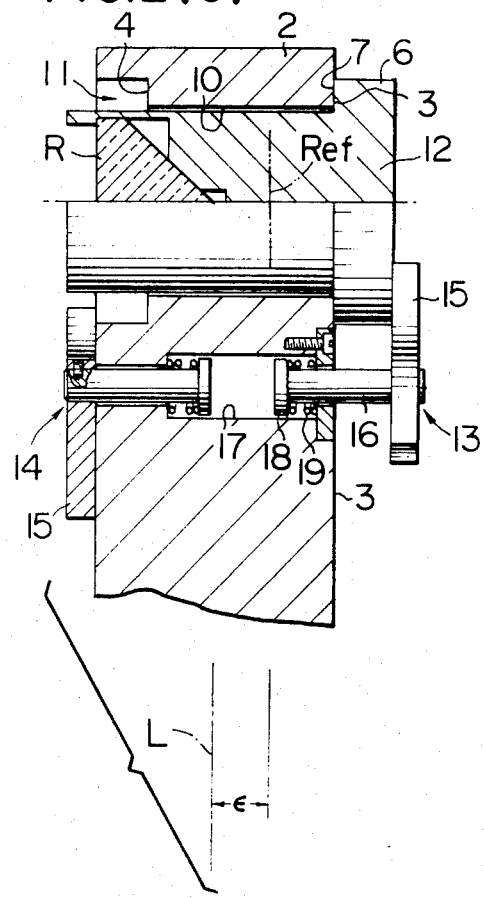
FIG. 2(C) is a sectional view showing the device in one operative position.

Referring now to the drawings, particularly to FIGS. 1(A), 1(B) and 1(C), there is shown a reflecting mirror device for an optical distance measuring apparatus in accordance with a first embodiment of the present invention. The mirror device includes a holder 2 which has a tripod fitting member 1 for fitting the device to a tripod not shown. The holder 2 comprises a base 2a and a peripheral flange 2b formed around the periphery of the base 2a. The base 2a has an outer surface defining a reference surface 3 and an inner surface defining another reference surface 4. Three screw threaded holes 5 are formed so as to penetrate through the base 2a. A frame 6 mounting a corner cube type prism R has a threaded stub shaft 8 which is adapted to be engaged with each of the threaded holes 5. The frame 6 is formed at the root of the shaft 8 with a reference surface 7. As shown in FIG. 1(A), three frames 6 can be mounted on the holder 2.

In the arrangement described above, when the frame 6 is mounted in such a manner that its reference surface 7 comes into contact with the surface 4 as shown in FIG. 1(B), the imaginary reflecting surface Ref of the prism R is offset with respect to the axis L of the tripod fitting member 1, that is, at a position which deviates from the point to be measured by a distance $\epsilon$ when the device is fitted to the tripod and is positioned with the axis L in vertical alignment with the point to be measured. If the frame 6 is mounted as depicted in FIG. 1(C) so that the reference surface 7 is in contact with the surface 3, the imaginary reflecting surface Ref comes into conformity with the axis L of the tripod fitting member 1. It should therefore be understood that the device can possess alternately the prism constants of zero and $\epsilon$ by changing the fitting direction of the frame 6 in the normal and reverse directions in the reflecting mirror device of this embodiment.

FIGS. 2(A) through 2(D) show a second embodiment of the present invention, wherein FIG. 2(A) is a front view of the device. In these drawings, like reference numerals represent like parts as in the first embodiment and the explanation of these parts will hereby be omitted. Three fitting holes 10 are bored on the holder 2 so as to mount and hold frames 6 which respectively carry corner cube type prisms R. The holder 2 is formed at one side with a reference surface 3 and at the opposite side with a recessed portion 11 for defining another reference surface 4 by the bottom thereof. A flange portion 12 is formed on the frame 6 and the front surface of this flange 12 defines a reference surface 7. First and second fixing members 13 and 14 are provided respectively on the back and front sides of the holder 2 so as to fix the frame 6 when it is fitted into the fitting hole 10. The first fixing member 13 includes a handle 15 having three spider arms and secured to a shaft 16 which is inserted into a hole 17 bored in the holder 2. At the end of the shaft 16 opposite to the handle 15, there is a flange 18 which is adapted to be engaged with a spring 19 provided in the hole 17 coaxially with the shaft 16 so as to be forced inwardly. The second fixing member 14 has substantially the same construction as the first fixing member 13 and includes a handle 15 and a shaft 16.

Figure 2D:
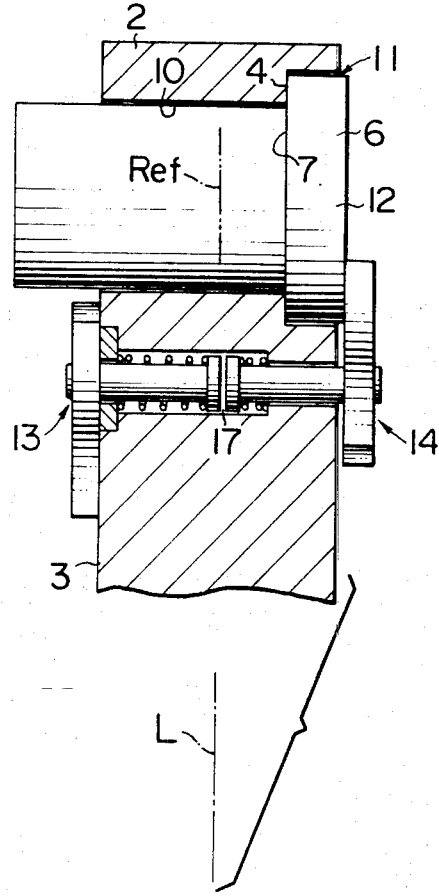
FIG. 2(D) is a sectional view showing the device in another operative position.

In operation, the frame 6 with the prism R mounted on it is inserted into the fitting holes 10 so that the reference surface 7 of the frame 6 is engaged with the reference surface 3 of the holder 2 and the handle 15 is then rotated while the first fixing member 13 is pulled out against the force of the spring 19 until its arms clamp and fix the flange portion 12 of the frame 6. In this instance, the imaginary reflecting surface Ref of the prism R is offset from the vertical line L by a distance $\epsilon$, so that the reflecting mirror device possesses a prism constant $\epsilon$. When the frame 6 is mounted on the holder 2 in the opposite direction as shown in FIG. 2(D), the reference surface 7 on the frame 6 is engaged with the bottom surface of the recessed portion 11 of the holder 2, that is, the reference surface 4. The handle 15 of the second fixing member 14 is then operated so as to clamp and fix the flange 12 of the frame 6 by one of its arms. In this instance, the imaginary reflecting surface Ref is aligned with the line L and the device is arranged with zero prism constant. It should of course be noted that in this second position the imaginary reflecting surface Ref may be positioned with an offset value which is different from that in the first position. Further, in this embodiment and also in the previous embodiment, up to three frames 6 can be mounted on the holder 2 so as to increase the capability of reflection.

Figure 3:
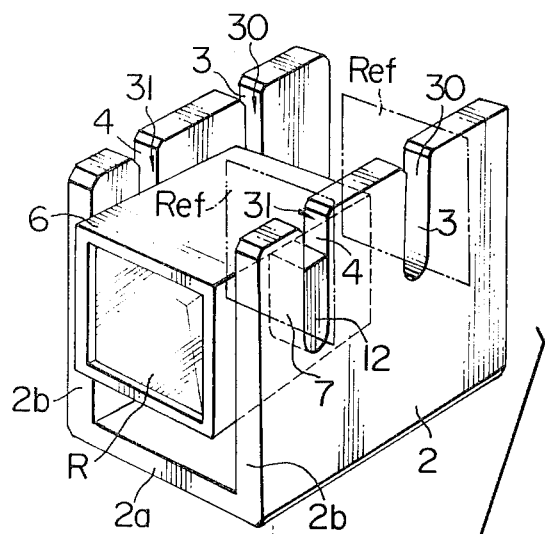
FIG. 3 is a perspective view of a reflecting device in accordance with a further embodiment of the present invention; and, FIG. 4 is a partially sectioned side view showing still further embodiment of the present invention.

FIG. 3 is a perspective view of the third embodiment of the present invention, in which like reference numerals represent like parts as in the first embodiment and the explanation on such parts will not be given. The holder 2 in this embodiment is of a U-shaped configuration having a bottom 2a and a pair of side walls 2b. First and second insertion grooves 30 and 31 are formed on both side walls of this block. The frame 6 is of a rectangular configuration having a pair of flanges 12 at the opposite side walls thereof. The flange portions 12 are adapted to be inserted alternately into these grooves 30 and 31. In this case, the inner surfaces of the first and second insertion grooves 30, 31 and the outer surface of the flange 12 define the reference surfaces 3, 4 and the reference surface 7, respectively.

Figure 4:
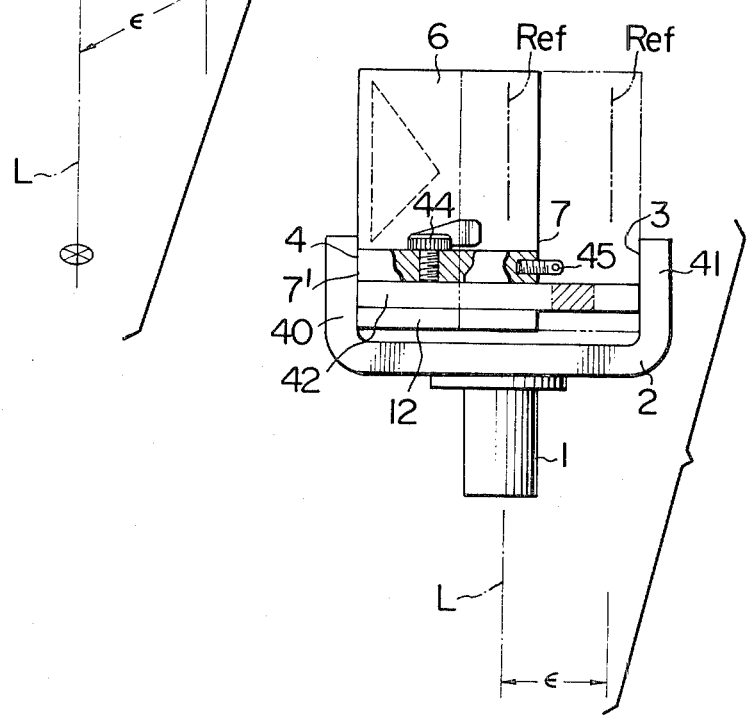

When the flange portion 12 of the frame 6 is inserted into the second insertion groove 31 as shown in FIG. 4, the imaginary reflecting surface Ref of the prism R is aligned with the vertical line L and the device is arranged with zero prism constant. Conversely, when the flange portion 12 of the frame 6 is inserted into the first insertion groove 30, the imaginary reflecting surface Ref is offset from the line L by the distance $\epsilon$ so that the reflecting mirror device is arranged with the prism constant $\epsilon$.

FIG. 4 is a partial sectional view showing the fourth embodiment of the present invention in which like reference numerals represent like parts as in the first embodiment and the explanation will not be made on such parts. The holder 2 is of an U-shaped configuration having first and second walls 40 and 41 which are formed at the front and rear portions of the holder 2 and a rail 42 bridging these walls 40 and 41 is fitted to the holder. The frame 6 has a downwardly extending flange portion 12 which is slidably engaged with the rail 42. A fixing screw 44 is threaded into the flange portion 12 so as to fix the frame 6 on the rail 42. In this instance, the inner surface of the second wall 41 serves as the reference surface 3 and the inner surface of the first wall 40 serves as the reference surface 4. The front and rear surfaces of the assembly 6 serve as the reference surfaces 7 and 7', respectively.

When the front surface or the reference surface 7' of the frame 6 is engaged with the inner surface 4 of the first wall 40 as shown in FIG. 4, the imaginary reflecting surface Ref of the prism R is aligned with the vertical line L so that the reflecting mirror device is arranged with zero prism constant. On the other hand, when the frame 6 is fixed on the rail 12 so that the rear surface 7 is engaged with the inner surface 3 of the second wall 41 of the holder 2 the imaginary reflecting surface Ref of the prism R is offset from the vertical line L by a distance $\epsilon$ so that the reflecting mirror device possesses a prism constant $\epsilon$.

It is possible to use a stop pin 45 screwed to the frame 6 in place of the reference surface 7 as shown in FIG. 4. In this case, a reflecting mirror having variable prism constants can be obtained by adjusting the pin 45.

As described above, the present invention provides a reflecting mirror device having at least two different prism constant by use of a single reflecting mirror device and eliminates the conventional necessity of preparing reflecting mirror devices having predetermined prism constants for exclusive use in various optical distance measuring devices.

In the foregoing embodiments, the devices have only two prism constants, however, the present invention is not limited to such a case in particular, but can be of course modified in various ways.

I claim:

1. A reflector device for use with an optical distance measuring apparatus comprising: optical reflecting means for reflecting a beam of light and having a prism constant related to the location of the effective reflecting surface thereof; frame means to which said optical reflection means is secured, said frame means having at least one first locating means; holder means for receiving said frame means in at least two different positions, said holder means having at least two second locating means, each adapted for engagement with the first locating means on the frame means; whereby the reflector device has a first prism constant when the first locating means comes into contact with one of the second locating means of the holder means with the frame means in one position in the holder, and a second prism constant when the first locating means comes into contact with the other of said second locating means of the holder means with the frame means in a second position in the holder.

2. A reflector device in accordance with claim 1 in which one of said first and second prism constants is zero.

3. A reflector device in accordance with claim 1 in which said first and second locating means are defined by surfaces formed on said frame means and on said holder means, respectively.

4. A reflector device in accordance with claim 1 in which said frame means has a threaded shaft and a flat surface formed at the root portion of said threaded shaft to define said first locating means, said holder means having a vertical wall formed with a threaded hole for engagement with said threaded shaft on said frame means, said vertical wall having opposite surfaces defining said second locating means for engagement with said flat surface on the frame means.

5. A reflector device in accordance with claim 1 in which said holder means includes a block formed with a passage for receiving said frame means, said block being formed at opposite end portions of said passage with flat surfaces for defining said second locating means, said frame means having a flange defining said first locating means so that two different prism constants can be obtained by inserting the frame means into said passage in opposite directions.

6. A reflector device in accordance with claim 1 in which said holder means has a plurality of grooves defining said second locating means, said frame means having flange means for engagement with said grooves, said flange means on said frame means defining said first locating means.

7. A reflector device in accordance with claim 1 in which said holder means has two opposite wall surfaces defining said second locating means and having a guide rail extending between the wall surfaces, said frame means being slidably engaged with the rail and having two vertical walls defining said first locating means.

8. A reflector device for use with an optical distance measuring apparatus including: optical reflecting means for reflecting a beam of incident light in a direction parallel to the beam of incident light; frame means to which said optical reflection means is secured, said frame means having at least one first locating means; holder means for mounting said frame means, said holder means having at least two spaced apart second locating means adapted for cooperation with the first locating means on said frame means, said frame means being able to be mounted on said holder means in at least two different positions, one being the position wherein the first locating means cooperates with one of said second locating means, the other being the position wherein the first locating means cooperates with the other of the second locating means, whereby the reflector device has a first prism constant in said one position and a second prism constant which is different from the first prism constant in said other position of the frame means.

* * * * *

UNITED STATES PATENT AND TRADEMARK OFFICE
CERTIFICATE OF CORRECTION

PATENT NO. : 4,470,664  
DATED : September 11, 1984  
INVENTOR(S) : Akishige Shirasawa It is certified that error appears in the above-identified patent and that said Letters Patent is hereby corrected as shown below:

Figure 1(B) of the drawings should be deleted to appear as per the attached Figure 1(B).

UNITED STATES PATENT AND TRADEMARK OFFICE
CERTIFICATE OF CORRECTION

PATENT NO.  : 4,470,664
DATED       : September 11, 1984
INVENTOR(S) : Akishige Shirasawa It is certified that error appears in the above-identified patent and that said Letters Patent is hereby corrected as shown below:

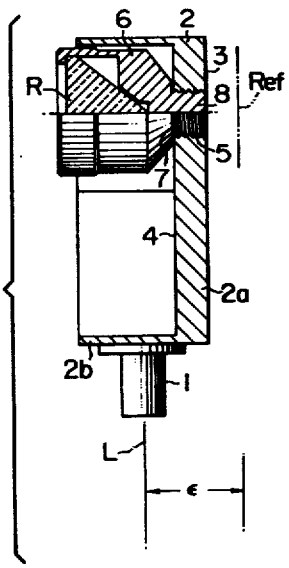

FIG.I(B)

Signed and Sealed this

Thirtieth Day of April 1985

[SEAL]

Attest:

DONALD J. QUIGG

Attesting Officer    Acting Commissioner of Patents and Trademarks